United States Patent
Chen et al.

(10) Patent No.: US 10,278,341 B2
(45) Date of Patent: May 7, 2019

(54) METHOD OF DRIP IRRIGATION UNDER PLASTIC FILM FOR RICE CROPPING

(71) Applicant: XINJIANG TIANYE (GROUP) CO., LTD., Shihezi, Xinjiang (CN)

(72) Inventors: Lin Chen, Xinjiang (CN); Yongqiang Wang, Xinjiang (CN); Yifeng Chen, Xinjiang (CN); Gaohua Li, Xinjiang (CN); Chengcheng Hu, Xinjiang (CN)

(73) Assignee: XINJIANG TIANYE (GROUP) CO., LTD., Shihezi (CN)

( * ) Notice: Subject to any disclaimer, the term of this patent is extended or adjusted under 35 U.S.C. 154(b) by 8 days.

(21) Appl. No.: 14/898,078

(22) PCT Filed: Dec. 27, 2013

(86) PCT No.: PCT/CN2013/001653
§ 371 (c)(1),
(2) Date: Dec. 11, 2015

(87) PCT Pub. No.: WO2015/095989
PCT Pub. Date: Jul. 2, 2015

(65) Prior Publication Data
US 2016/0150745 A1 Jun. 2, 2016

(51) Int. Cl.
*A01G 25/02* (2006.01)
*A01G 22/22* (2018.01)
*A01G 13/02* (2006.01)

(52) U.S. Cl.
CPC ......... *A01G 25/02* (2013.01); *A01G 13/0268* (2013.01); *A01G 22/22* (2018.02); *Y02A 40/237* (2018.01)

(58) Field of Classification Search
CPC ..... A01G 25/02; A01G 13/0268; A01G 16/00
See application file for complete search history.

(56) References Cited

FOREIGN PATENT DOCUMENTS

CN 101422120 A 5/2009

OTHER PUBLICATIONS

Cao, Zhihua; "Fully Mechanized Technology of Drip Irrigation under Plastic Film of hte Rice Cultivated in Aerobic Soil", Xinjiang Agricultural Mechanization, No. 6, Dec. 31, 2012, p. 43, col. 1, line 1 to p. 44, col. 1, line 18.
Yue, Xuanli et al., "Research on the Macthing Technologies of the Cultivation Agronomy and Agricultural Machinery of Drip Irrigation under Plastic Film of Rice", Xinjiang Agricultural Mechanization, No. 3, Jun. 30, 2013, p. 10, col. 2, lines 1-18.
Chen, Lin et al., "The Formation and Development of CUltivation Techniques of Drip Irrigation under Plastic Film of Rice", Crop Research, No. 5, vol. 26 Sep. 15, 2012, the whole document.

*Primary Examiner* — Kristen C Hayes
(74) *Attorney, Agent, or Firm* — Jiwen Chen

(57) ABSTRACT

The present invention provides a method for rice cultivation via drip irrigation under a plastic film, comprising seed preparation, land preparation, sowing, seedling management, irrigation management, fertilization management, pest control and other steps, wherein seeding density of the sowing is 33300-36000 holes/mu, preferably 33300 holes/mu, or the seeding density is 30500-32600 holes/mu, preferably 30500 holes/mu. Previously, the conventional film with width of 105 cm or 145 cm is adopted for cotton culture stage in Xinjiang, but these films have following disadvantages: lower land utilization rate, resulting in relatively low seeding density, and difficulty in the process of adjusting row spacing and increasing seeding density, lower ground coverage rate, larger area of open ground, causing more weed relatively. Therefore, using wide film cultivation obtains relatively high yield if other planting conditions are the same.

10 Claims, 2 Drawing Sheets

METHOD OF DRIP IRRIGATION UNDER PLASTIC FILM FOR RICE CROPPING

This is a U.S. national stage application of PCT Application No. PCT/CN2013/001653 under 35 U.S.C. 371, filed Dec. 27, 2013 in Chinese, which is hereby incorporated by reference.

TECHNICAL FIELD

The present invention belongs to the field of crop cultivation, specifically relates to a method for rice cultivation via technology of drip irrigation under plastic mulch films.

BACKGROUND ART

Rice is an important food crop in China. Traditionally, the paddy soils cultivating with steeping field (field water layer: 3-10 cm) is given priority. China is one of the 13 poor-in-water countries in the world, and also is an agricultural country. Agricultural water takes up 70-80% of the total water consumption, especially in the arid and semi-arid region, being up to above 90%, and the total water content of paddy field is 65% above. Due to the change of global climate in recent years, spring drought/summer drought and other phenomenon occurs frequently, resulting in the large-area reduction of output in North Rice planting region, striking a serious blow at the planting enthusiasm of farmers. At present, plastic mulch films mulching is used to plant rice in dry farmland (abbreviated as dry farming), so as to achieve the purpose of warming, water conservation and volume increase, and such technique has been popularized and applied in rice-growing area throughout the country.

In the "rice direct seeding and dry-farming planting method via drip irrigation under plastic mulch films" disclosed by Chinese Patent No. 200710169613.8, the arrangements of drip irrigation zone, plastic film mulch, and seeding are completed at the same time via special seeding machinery. The drip irrigation zone is located below the plastic mulch films, and connected with water conveyance system, based on the needs of crop growth, timely and appropriately carry out dripping fertilization. But such technique only implements a preliminary scheme for the key technology of the rice cultivation method via drip irrigation under plastic mulch film. After many years of practice, such technique was found to be not very appropriate. Moreover, at present, for various reasons, the method in the cultivation techniques for other field crops via drip irrigation under plastic mulch films popularized in Xinjiang with large areas cannot be directly applied in the production process of rice drip irrigation under plastic mulch film.

SUMMARY OF THE INVENTION

The present invention provides a method for rice cultivation via drip irrigation under plastic mulch films, aiming at the key technology in the cultivation process of rice drip irrigation under plastic mulch films, rational configuration is implemented to propose a technical system of broad-film rice cultivating via drip irrigation under plastic mulch films, which lays a foundation to the high yield and high efficiency of the rice cultivation method via drip irrigation under plastic mulch films, under the premise of meeting the density and water fertilizer demands of rice using drip irrigation under plastic mulch films.

The present invention provides a method for rice cultivation via drip irrigation under plastic mulch films, comprising steps of seed preparation, land preparation, sowing in lines, seedling management, irrigation management, fertilization management, pest termination, etc., wherein the seeding density is 33300-36000 holes/mu, preferably 33300 holes/mu, or the seeding density is 30500-32600 holes/mu, preferably 30500 holes/mu.

Preferably, when the seeding density is 33300 to 36000 holes/mu, the width of each film is 215-225 cm, preferably 220 cm, and the distance between holes within same line is 9-10 cm, the planting width is 235-245 cm, preferably 240 cm, the preferred planting arrangement of every twelve lines under one film and using three drip tubes is such that distances between neighboring lines are as follows:

13 cm, 24 cm, 13 cm, 20 cm, 13 cm, 24 cm, 13 cm, 20 cm, 13 cm, 24 cm, 13 cm and 50 cm, respectively, three drip tubes are distributed among 12 lines of rice evenly.

Preferably, when the seeding density is 30500-32600 holes/mu, width of each film is 155-165 cm, preferably 160 cm, and distance between holes within same line is 9-10 cm, planting width is 170-180 cm, preferably 175 cm, the preferred planting arrangement of every eight lines under one film and using two drip tubes is such that distances between neighboring lines are as follows:

12.5 cm, 26 cm, 12.5 cm, 26 cm, 12.5 cm, 26 cm, 12.5 cm and 47 cm, respectively, two drip tubes are distributed among 8 lines of rice evenly.

Preferably, the land preparation comprises weed prevention, wherein the weed prevention involves soil sealing treatment before sowing, spraying mixed herbicides, and re-spraying mixed herbicides 15 to 25 days later after planting.

Preferably, during the seedling management, wherein rooting agent is dripped with water from planting to tillering period, and its dosage is 1.5 to 2.5 times of the proposed dosage of the manufacturer.

Preferably, seedlings releasing intertillage is implemented in trefoil stage, and the ploughing depth is 15-20 cm.

Preferably, the irrigation management is implemented via applying irrigation norm 10500-12000 $m^3/hm^2$. During the whole growth period of the rice, preferably, drip irrigation is implemented 38 to 45 times during the whole growth period of the rice. The irrigation period is 3 to 4 days, and 1 to 2 days during water-demand peak season.

Furthermore, the specific methods of the irrigation management are as follows:

Emergence of Seedlings to Trefoil Stage:

When the soil moisture status is poor after rice growing, seedling water is timely dripped after planting, irrigation is carried out for 2 to 3 times, the total irrigation amount is 900-1200 $m^3/hm^2$;

Trefoil Stage to Jointing Period:

In such a period, irrigation is carried out for 8 to 10 times, the total irrigation amount is 2400-2700 $m^3/hm^2$;

Jointing to Heading Period:

In such a period, dripping is carried out for 9 to 10 times, the total irrigation amount is 2700-3000 $m^3/hm^2$;

Heading to Flowering Period:

In such a period, dripping is carried out for 5 to 6 times, the total irrigation amount is 1200-1500 $m^3/hm^2$;

Flowering to Ripeness Period:

In such a period, dripping is carried out for 14 to 16 times, the total irrigation amount is 3300-3600 $m^3/hm^2$, irrigation is stopped at the end of rice waxen maturity.

Preferably, in the full growth period, the pure nitrogen fertilizer amount of the rice using drip irrigation under plastic mulch films in the fertilization management is 330-345 $kg/hm^2$, preferably, 330 $kg/hm^2$, more preferably, the total fertilizing amount of the rice using drip irrigation under plastic mulch films in the full growth period of the fertilization management is 15-20 t/hm$^2$ of animal manure, 120-150 kg/hm$^2$ of soluble organic fertilizer, 300-330 kg/hm$^2$ of pure nitrogen, 150-160 kg/hm$^2$ of P$_2$O$_5$, 70-90 kg/hm$^2$ of K$_2$O, 25-30 kg/hm$^2$ of water-soluble Si-fertilizer, and 7-8 kg/hm$^2$ of boric fertilizer and zinc fertilizer respectively.

Furthermore, the specific methods of the fertilization management are as follows:

Base Fertilizer:

Farmyard manure is applied when ploughing field in autumn approaching winter, 15-20 t/hm$^2$ of animal manure and 40-50 kg/hm$^2$ of diamonium are applied for one time and evenly, and then the field is deeply ploughed;

Seedling Fertilizer:

The paddy field is fertilized based on the crops. If the soil is saline and alkaline, has uneven fertility, or lack of nutrients, and some seedlings are weak, 20-30 kg/hm$^2$ of pure nitrogen, 25-30 kg/hm$^2$ of P$_2$O$_5$, 10-15 kg/hm$^2$ of K$_2$O and 3.5-4 kg/hm$^2$ of zinc fertilizer are dripped along with water for twice or three times to promote the growth of seedlings.

Tillering Fertilizer:

In such a period, 110-120 kg/hm$^2$ of pure nitrogen, 30-40 kg/hm$^2$ of P$_2$O$_5$, 10-15 kg/hm$^2$ of K$_2$O, 25-30 kg/hm$^2$ of water-soluble silicon-fertilizer, 7-8 kg/hm$^2$ of boric fertilizer and 3.5-4 kg/hm$^2$ of zinc fertilizer are applied along with water in 3 times to promote the effective tiller number and quality of nutrient storage of the rice.

Jointing Fertilizer:

In such a period, fertilizer is dripped for 2 to 3 times, and the total fertilizing amount is: 110-120 kg/hm$^2$ of pure nitrogen, 35-40 kg/hm$^2$ of P$_2$O$_5$, 25-30 kg/hm$^2$ of K$_2$O and 60-75 kg/hm$^2$ of soluble organic fertilizer;

Earing Fertilizer:

In such a period, fertilizer is dripped for 3 to 4 times, the total fertilizing amount is: 50-60 kg/hm$^2$ of pure nitrogen, 30-40 kg/hm$^2$ of P$_2$O$_5$, 25-30 kg/hm$^2$ of K$_2$O and 60-75 kg/hm$^2$ of a soluble organic fertilizer.

Specific steps of the method for rice cultivation via drip irrigation under a plastic mulch films are as follows:

1. Seed Preparation

Due to its own properties, there is about 5 mm awn in a rice seed, and there are short hairs on seed epidermis and the seed has strong acerbity, causing mutual blocking among seeds during mechanization sowing, which fails to achieve the requirements for fined seeding in large-area mechanization direct seeding, resulting in uneven seeding and irregular seedling emergence. Therefore, before seeding, it is necessary to carry out deawning processing for rice seeds by using special small-size deawning machinery, and relatively ideal effect could be achieved by processing each batch of seeds for 4 to 6 minutes.

2. Land Preparation

As the method for rice drip irrigation under plastic mulch films changes the traditional flooding irrigation into drip irrigation under plastic mulch films. During the production process, the types of field weeds vary therefrom, and the traditional paddy weeding method has no obvious effect or even no effect on the paddy field of drip irrigation under plastic mulch films. Therefore, the prevention of weeds in the paddy field of drip irrigation under plastic mulch films is mainly implemented via spraying composite herbicide for soil sealing removal before seeding, so as to minimize the harm of weeds. During the full growth period of the rice drip irrigation under plastic mulch films, the chemical weeding method combined with manual weed removal method is used to remove weeds: generally, carrying out soil sealing treatment 5 days ahead of seeding, spraying 80 g of composite herbicide per mu, 15 to 25 days after seeding, when the weeds in the paddy field of drip irrigation under plastic mulch films occur the first peak, applying 60 g of composite herbicide per mu. The specific types of agents may depend on the types of the field weeds, several kinds of agents are selected in targeted for mixing, and used for twice chemical control. It is appropriate to choose the farmland with the soil containing above 1.5% organic content, above 50 mg/kg alkali-hydrolyzale nitrogen, more than 18 mg/kg of rapid available phosphorus, moderate soil fertility and above, and a small amount of salt and alkali, so as to facilitate a high yield.

3. Sowing

When the 5 cm-under-film ground temperature is stably above 15° C., sowing can be done. Generally, it is in the early of middle April in South Xinjiang and later period of middle April in North Xinjiang. Seeding amount is determined based on the Thousand Kernel Weight, the seeding rate per hectare is determined by 25 g TKW, the mechanical sowing rate per hectare of the rice via drip irrigation under plastic mulch films is about 120-150 kg. For the rice varieties with smaller TKW, the size of the seeding hole is appropriately reduced, otherwise enlarged, so as to ensure that the number of the seeding particles is 7-9 for each hole. The process of drip irrigation zone pavement via drip irrigation under plastic mulch films sower, plastic mulch films mulch, dibbling, earthing should be completed for one time. It requires even seeding, no re-seeding, no miss-seeding, consistent seeding depth, good earthing, reliable pressing, upright row from edge to edge. As the cultivation technique of drip irrigation under plastic mulch films is adopted for rice planting, the ear-forming law of rice essentially changes from tiller-earing under flooding irrigation to stem earing, the traditional planting density could not satisfy the needs of production, which means that the seeding density of the rice via drip irrigation under plastic mulch films is higher, and the seed spacing layout of the traditional field crops could not directly apply to the cultivation of the rice via drip irrigation under plastic mulch films. Therefore, the improved packing auger-type earthing seeding device is used for sowing, the Patent Number of the packing auger-type earthing seeding device is 201310307046.3, seeding density is 33300-36000 holes/mu, preferably 33300 holes/mu, width of each film is 220 cm, distance between holes within same line is 9-10 cm, planting arrangement of every twelve lines under one film and using three drip tubes is such that distances between neighboring lines are as follows, namely, the 13 cm, 24 cm, 13 cm, 20 cm, 13 cm 24 cm 13 cm 20 cm 13 cm 24 cm, 13 cm and 50 cm, respectively, 3 drip tubes are evenly distributed among 12 rows of paddy, and the average spacing for placing drip tubes is 78 cm. The line spacing and distance between holes within same line in such seeding mode could slightly fluctuate based on the actual situation of the seeding machinery, as long as it ensures seeding density, and it ensures that the planting width of the single film is 240 cm by properly adjusting the size of seed tray of the seeding machinery and of the planting box in the field installation.

Alternatively, seeding density is 30500-32600 holes/mu (preferably 30500 holes/mu), width of each film is 150 cm, 1-film-2-tube-8-line, distance between holes within same line is 10 cm, planting width is 165 cm, and the configuration of line spacing is as follows: 10 cm, 26 cm, 10 cm, 26 cm, 10 cm, 26 cm, 10 cm and 47 cm, respectively. 2 drip tubes are distributed among 8 lines of rice evenly, and the average spacing for placing drip tubes is 82.5 cm.

Due to the great change in seeding density, width of each film, distance between holes within same line and line spacing configuration mode compared with traditional rice planting, it needs to re-test the management in rice seedling stage, total amount of irrigation water, irrigation water capacity for each time, irrigation frequency, total fertilizing amount, each fertilizing amount, timing injection of fertilizer and other parameter, so as to obtain the maximum output under such seeding density. Through numerous tests, the inventors obtain the maximum yield of rice through such management mode disclosed in the present invention.

4. Seedling Management

A root system is a vital organ for rice to assimilate nutriment, directly influencing the growth and development conditions of the rice. In seedling period, rice has poor stress resistance, and is very easily affected by low temperature, drought and other atrocious weather. Therefore, in order to improve rate of emergence, promote root development, and improve the stress resistance, the rooting agent or root-strengthening agent is adopted in the seedling period of the rice via drip irrigation under plastic mulch films for processing, generally, dripping 1 to 3 times before tillering stage after seeding, each dosage is 150-250 ml, the type of specific rooting agent can be selected according to local market research, the dosage is 1.5 to 2.5 times of the one recommended by manufacturer, the recommended dosage of the manufacturer is generally the one for root irrigation, but the relative dosage of the dripping with water is large, such range is obtained from test, capable of being up to the application effect of the agent better: when the dosage is 1.5 to 2.5 times of the one recommended by manufacturers, the height of rice plant, chlorophyll content, average tiller number, net photosynthetic rate, leaf transpiration rate, intercellular space $CO_2$ concentration in rice leaf (the higher the intercellular space $CO_2$ concentration is, the stronger the leaf respiration is, the more the absorbed energy of the crops is, so as to achieve high yield of rice), rice yield and the like are obviously higher than the effect of the recommended dosage of the rooting agent.

5. Seedlings Releasing Intertillage

For the paddy fields with drip irrigation under plastic mulch films, if there is the failure of emergence of seedlings by own, seedlings are timely checked and released, so as to avoid rotten seedling. Intertillage is omitted or implemented for once during the full growth period of the rice: it is in trefoil stage, the purpose of intertillage is to loosen the soil, preserve soil moisture and wipe out weeds. It is required to use sweep point to cut soil, smash and rise to the soil separation plate, and ploughing depth can be up to 15-20 cm. Seedling pressing and folding are not allowed. During wide-film planting, the main purpose of intertillage is to weed out, the seedling height is about 15 cm during trefoil stage, in such stage, intertillage has relatively small harm to plants, after this period, starting to carry out a large quantity of irrigation fertilizing, if intertillage is adopted again, the operative difficulty index of the agricultural machinery increases.

6. Irrigation Management

Irrigation systems vary greatly with different regions and different soil texture. Generally, dripping 38 to 45 times during full growth period, irrigation period is 3 to 4 days (adjusted to 1 to 2 days in water-need peak season), and irrigation norm is about 10500-12000 $m^3/hm^2$.

In which,

Emergence of Seedlings to Trefoil Stage:

When the soil moisture status is poor after rice growing, timely dripping seedling water after planting, carrying out irrigation for 2 to 3 times, the total irrigation amount is 900-1200 $m^3/hm^2$;

Trefoil Stage to Jointing:

In such a period, carrying out irrigation for 8 to 10 times, the total irrigation amount is 2400-2700 $m^3/hm^2$.

Jointing to Heading:

In such a period, carrying out dripping for 9 to 10 times, the total irrigation amount is 2700-3000 $m^3/hm^2$.

Heading to Flowering:

In such a period, carrying out dripping for 5 to 6 times, the total irrigation amount is 1200-1500 $m^3/hm^2$.

Flowering to Ripe:

In such a period, carrying out dripping for 14 to 16 times, the total irrigation amount is 3300-3600 $m^3/hm^2$, stopping irrigation at the end of rice waxen maturity.

7. Fertilizing Management

Usually, based on the soil fertility and fertilizer response effects of the rice planting fields, the target yield and fertilizing amount are determined, the principle of organic and inorganic combination should be used in the rice fertilization, at the same time paying attention to integrate with the fertilizer practice and high yield and high quality cultivation techniques, especially noting water and fertilizer joint control. During the full growth period of rice, the total fertilizing amount is as follows: animal manure (compost chicken manure and cow dung are mixed by mass ratio of 3:2): 15-20 $t/hm^2$, soluble organic fertilizer: 120-150 $kg/hm^2$, the soluble organic fertilizer is purchased from: *Sporotrichum* thermophile series of water flush fertilizer produced by Weifang Wofeng Biological Fertilizer Co., Ltd, pure nitrogen 300-330 kg/hra$^2$, $P_2O_5$ 150-160 kg /$hm^2$, $K_2O$ 70-90 $kg/hm^2$, water-soluble Si-fertilizer 25-30 $kg/hm^2$, boric fertilizer and zinc fertilizer 7-8 $kg/hm^2$ respectively.

In which,

Base Fertilizer:

Fertilizing farmyard manure when ploughing fields in autumn approaching winter, 15 to 20 $t/hm^2$ of animal manure (compost chicken manure and cow dung are mixed by mass ratio of 3:2) and 40-50 $kg/hm^2$ of diamonium phosphate are fertilized for one time evenly, and then, the fields are deeply ploughed up to 27-30 cm and then leveled.

Seedling Fertilizer:

Fertilizing paddy field based on the seedlings, if soil is saline and alkaline, has uneven fertility, lack of nutrient, and some seedlings are weak, 20-30 $kg/hm^2$ of pure nitrogen, 25-30 $kg/hm^2$ of $P_2O_5$, 10-15 $kg/hm^2$ of $K_2O$ and 3.5-4 $kg/hm^2$ of Zinc fertilizer are dripped along with water in 2 or 3 times to promote the growth of seedlings.

Tillering Fertilizer:

Tillering stage is a critical period for the vegetative growth of rice, determining the number of effective tillering and conditions of nutrient storage, in such a period, 110 to 120 $kg/hm^2$ of pure nitrogen, 30-40 $kg/hm^2$ of $P_2O_5$, 10-15 $kg/hm^2$ of $K_2O$, 25-30 $kg/hm^2$ of water-soluble Si-fertilizer, 7-8 $kg/hm^2$ of Boric fertilizer and 3.5-4 $kg/hm^2$ of Zinc fertilizer are applied along with water in 3 times to promote the effective tiller number and quality of nutrient storage of the rice.

Jointing Fertilizer:

In such a period, vegetative growth and reproductive growth of rice are very vigorous, water fertilizer should be dripped to the weak seedling in advance, appropriately delaying dripping for flourishing and strong seedling, the fertilizer is dripped in 2-3 times, and the total fertilizing amount is: 110-120 kg/hm² of pure nitrogen, 35-40 kg/hm² of $P_2O_5$, 25-30 kg/hm² of $K_2O$ and 60-75 kg/hm² of soluble organic fertilizer;

Earing Fertilizer:

In such a period, young ear grows rapidly, and such a period is a critical period to develop seeds per ear. Fertilizer is dripped in 3 to 4 times, the total fertilizing amount is: 50-60 kg/hm² of pure nitrogen, 30-40 kg/hm² of $P_2O_5$, 25-30 kg/hm² of $K_2O$ and 60-75 kg/hm² of soluble organic fertilizer.

Tests have Proved that:

(1) With the increase of nitrogen application rate, tillering tends to increase, and there is significant differences between different nitrogen application rates, but excessive nitrogen application rate fails to obtain maximum tiller number, and when the application rate of pure nitrogen is 330 kg/hm², the tiller number is significantly higher than other application rate.

(2) In each growth period, the weight of dry matter processed by nitrogen fertilizer is significantly higher than the one without nitrogen treatment, and moreover, in jointing stage, with the increase of nitrogen application amount, the accumulation of dry matter increases significantly. In harvest time, with the increase of nitrogen application amount, the accumulation of dry matter firstly increases and then decreases, mainly caused by excessive application of nitrogen fertilizer, resulting in excess vegetative growth, influencing the later grouting of rice. When the application rate of pure nitrogen is 330 kg/hm², the accumulation of dry matter is up to maximum.

(3) The application of nitrogen fertilizer can significantly increase the yield, mainly embodied in number of productive ears, kernels per spike, full grains and TKW. For different nitrogen application rates, with the increase of nitrogen application rates, the number of productive ears, kernels per spike, full grains and TKW tend to increase, but the difference between kernels per spike and full grains with different nitrogen application rate is small; through tests, when the application rate of pure nitrogen is 330 kg/hm², the net earning is up to maximum.

(4) With the increase of nitrogen application rate, the nutrition accumulation of the three elements N, P and K in the rice via drip irrigation under plastic mulch films will improve to a large extent, it is capable of greatly improving the utilization efficiency of phosphate and potash fertilizer. When the application rate of the pure nitrogen is 330 kg/hm², the total absorption amount of phosphate and potash fertilizer is up to maximum.

The inventors also studied the absorbed dose of fertilizer in each growth stage of the rice planted via the drip irrigation under plastic mulch films, and obtained the conclusion that in each growth stage of rice, it is capable of meeting the fertilizer needs of the rice planted via the drip irrigation under plastic mulch films in each period, at the same time, there is no waste of fertilizer, making each value of the rice planted via the drip irrigation under plastic mulch films such as number of productive ears, kernels per spike, full grains, TKW up to maximum.

8. Pest Termination

Under weather conditions in Xinjiang and drip irrigation cultivation mode, there is less pest and disease damage in the rice, in recent years, there is almost no pest carrying serious damage in the experimental field. Additionally, a small number of physiological bacterial wilt occurs in boundary land, it is required to timely check the irrigation zone of the boundary land in the next year and timely deal with it to meet normal water demand of rice.

Previously, the conventional film with width of 105 cm or 145 cm is adopted for cotton culture stage in Xinjiang, but these films have the following disadvantages: lower ground coverage rate, resulting in relatively low seeding density, and more weeds relatively. Therefore, wide film cultivation is used to obtain relatively high yield if other planting conditions are the same. There is significant correlation between rice quality and water fertilizer control, and low correlation between rice quality and width of each film while adopting drip irrigation under plastic mulch films.

Besides the change of width of each film, on the basis of the original technology, the present invention increases the application of herbicide and rooting agent at seedling stage, it has more specific requirements for watering time and fertilizing amount: more specific watering time, in the original technology, whether to water in each growth period is determined by soil water content, it is difficult to operate in actual large area planting, and in prior art, the watering frequency (fertilizing frequency) and irrigation total amount (fertilizing amount) in each growth stage are quantified and optimized, through several years of data summary and analysis, the original technique states the fertilizing amount of the whole growth stage, and the prior art specifies the fertilizing amount to each growth period on the basis of changing total fertilizing amount, which enables operation more convenient.

SPECIFIC EMBODIMENTS OF THE INVENTION

Figure 1:
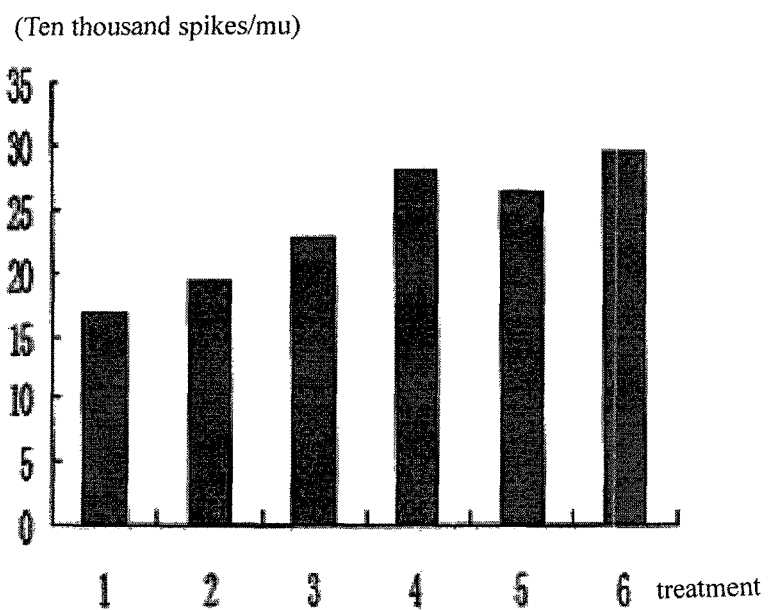
FIG. 1 is the comparison in number of productive ears of the rice using drip irrigation under plastic mulch films with different seeding densities.

The embodiments below are beneficial for getting a better understanding of the present invention, but not limited to the present invention. The experimental method in the embodiments below is conventional method if there is no special instruction.

The soluble organic fertilizer in the present invention is purchased from the: *Sporotrichum* series of water flush fertilizers produced by Weifang Wofeng Biological Fertilizer Co., Ltd.

Embodiment 1

The steps of planting rice using drip irrigation under plastic mulch films are as follows:

1. Seed Preparation

Before seeding, it is ensured to carry out deawning processing for rice seed by using special small-size deawning machinery, and relatively ideal effect could be achieved by processing each batch of seed for 5 minutes.

2. Land Preparation

During the full growth period of the rice drip irrigation under plastic mulch films, the chemical weeding method combined with manual weed removal method is used to remove weeds: generally, carrying out soil sealing treatment 5 days ahead of seeding, spraying 80 g of composite herbicide per mu, 15-25 days after seeding, when the weeds in the paddy field of drip irrigation under plastic mulch films occur the first peak, applying 60 g of composite herbicide per mu. The specific types of agents may depend on the types of the field weeds, several kinds of agents are selected in targeted for mixing, and used for twice chemical control. It is appropriate to choose the farmland with the soil containing above 1.5% organic content, above 50 mg/kg alkali-hydrolyzale nitrogen, more than 18 mg/kg of rapid available phosphorus, moderate soil fertility and above, and small amount of salt and alkali, so as to facilitate high yield.

3. Sowing

When the 5 cm-under-film ground temperature is stably above 15° C., sowing can be done. Generally, it is in the early of middle April in South Xinjiang and later period of middle April in North Xinjiang. Seeding amount is determined based on the Thousand Kernel Weight, the seeding rate per hectare is determined by 25 g TKW, the mechanical sowing rate per hectare of the rice via drip irrigation under plastic mulch films is about 120 kg. For the rice varieties with smaller TKW, the size of the seeding hole is appropriately reduced, otherwise enlarged, so as to ensure that the number of the seeding particles is 7-9 for each hole. The process of drip irrigation zone pavement via drip irrigation under plastic mulch films sower, plastic mulch films mulch, dibbling, earthing should be completed for one time. It requires even seeding, no re-seeding, no miss-seeding, consistent seeding depth, good earthing, reliable pressing, upright row from edge to edge. An improved packing auger-type earthing seeding device is used for sowing, the Patent Number of the packing auger-type earthing seeding device is 201310307046.3, seeding density is 33300 holes/mu, width of each film is 220 cm, distance between holes within same line is 10 cm, planting arrangement of every twelve lines under one film and using three drip tubes is such that distances between neighboring lines are as follows: 13 cm, 24 cm, 13 cm, 20 cm, 13 cm, 24 cm, 13 cm, 20 cm, 13 cm, 24 cm, 13 cm and 50 cm, respectively, 3 drip tubes are evenly distributed among 12 rows of paddy, and the average spacing for placing drip tubes is 78 cm, and the planting width of the single film is 240 cm.

4. Seedling Management

The rooting agent or root-strengthening agent can be adopted in the seedling period of the rice via drip irrigation under plastic mulch films for processing, generally, dripping 3 times before tillering stage after seeding, each dosage is 200 ml, the type of specific rooting agent can be selected according to local market research, and the dosage is 2.0 times of the one recommended by manufacturers.

5. Seedlings Releasing Intertillage

For the paddy fields with drip irrigation under plastic mulch films, if there is the failure of emergence of seedlings by own, seedlings are timely checked and released, so as to avoid rotten seedling. Intertillage is omitted or implemented for once during the full growth period of the rice: it is in trefoil stage, the purpose of intertillage is to loosen the soil, preserve soil moisture and wipe out weeds. It is required to use sweep point to cut soil, smash and rise to the soil separation plate, and ploughing depth can be 15 cm. Seedling pressing and folding are not allowed. During wide-film planting, the main purpose of intertillage is to weed out.

6. Irrigation Management

Irrigation systems vary greatly with different regions and different soil texture. Generally, dripping 40 times during full growth period, irrigation period is 3-4 days, and adjusted to 1-2 days in water-need peak season, irrigation norm is about 12000 $m^3/hm^2$.

In which,

Emergence of Seedlings to Trefoil Stage:

When the soil moisture status is poor after rice growing, timely dripping seedling water after planting, carrying out irrigation in 2 to 3 times, the total irrigation amount is 1200 $m^3/hm^2$.

Trefoil Stage to Jointing:

In such a period, carrying out irrigation for 9 times, the total irrigation amount is 2700 $m^3/hm^2$.

Jointing to Heading:

In such a period, carrying out dripping for 9 times, the total irrigation amount is 3000 $m^3/hm^2$.

Heading to Flowering:

In such a period, carrying out dripping for 5 times, the total irrigation amount is 1500 $m^3/hm^2$.

Flowering to Ripe:

In such a period, carrying out dripping for 15 times, the total irrigation amount is 3600 $m^3/hm^2$, stopping irrigation at the end of rice waxen maturity.

7. Fertilizing Management

Usually, based on the soil fertility and fertilizer response effects of the rice planting plot, the target yield and fertilizing amount are determined, the principle of organic and inorganic combination should be used in the rice fertilization. At the same time, paying attention to integrate with the fertilizer practice and high yield and high quality cultivation techniques, especially noting water and fertilizer joint control. During the full growth period of rice, the total fertilizing amount is as follows: animal manure (compost chicken manure and cow dung are mixed by mass ratio of 3:2) 20 $t/hm^2$, soluble organic fertilizer 120 $kg/hm^2$, pure nitrogen: 330 $kg/hra^2$, $P_2O_5$ 155 $kg/hm^2$, $K_2O$ 90 $kg/hm^2$, water-soluble Si-fertilizer 25 $kg/hm^2$, Boric fertilizer and Zinc fertilizer 7.5 $kg/hm^2$ respectively.

In which,

Base Fertilizer:

Fertilizing farmyard manure when ploughing fields in autumn approaching winter, 20 $t/hm^2$ of animal manure (compost chicken manure and cow dung are mixed by mass ratio of 3:2) and 40 $kg/hm^2$ of diamonium phosphate are applied for one time and evenly, and then, the fields are deeply ploughed up to 27-30 cm and then leveled.

Seedling Fertilizer:

Fertilizing paddy field based on the crops, if soil is saline and alkaline, has uneven fertility, lack of nutrient, spot leaf and some seedlings are weak, 22 $kg/hm^2$ of pure nitrogen, 25 $kg/hm^2$ of $P_2O_5$, 15 $kg/hm^2$ of $K_2O$ and 3.5 $kg/hm^2$ of zinc fertilizer are dripped along with water in 2-3 times to promote the growth of seedlings.

Tillering Fertilizer:

Tillering stage is a critical period for the vegetative growth of rice, determining the number of effective tillering and conditions of nutrients storing, in such period, 120 $kg/hm^2$ of pure nitrogen, 34 $kg/hm^2$ of $P_2O_5$, 15 $kg/hm^2$ of $K_2O$, 25 $kg/hm^2$ of water-soluble Si-fertilizer, 7.5 $kg/hm^2$ of Boric fertilizer and 4 $kg/hm^2$ of Zinc fertilizer are applied along with water in 3 times to promote the effective tiller number and quality of nutrient storage of the rice.

Jointing Fertilizer:

In such a period, vegetative growth and reproductive growth of rice are very vigorous, water fertilizer should be dripped to the weak seedling in advance, and appropriately delaying dripping for flourishing and strong seedling, fertilizer is dripped for 2 to 3 times, the total fertilizing amount is: 120 kg/hm² of pure nitrogen, 37 kg/hm² of $P_2O_5$, 30 kg/hm² of $K_2O$ and 60 kg/hm² of soluble organic fertilizer;

Earing Fertilizer:

In such a period, young ear grows rapidly, and such a period is a critical period to develop seeds per ear. Fertilizer is dripped in 3 to 4 times, the total fertilizing amount is: 60 kg/hm² of pure nitrogen, 37 kg/hm² of $P_2O_5$, 30 kg/hm² of $K_2O$ and 60 kg/hm² of soluble organic fertilizer.

8. Pest Termination

Under weather conditions in Xinjiang and drip irrigation cultivation mode, there is less pest and disease damage in the rice, in recent years, there is almost no pest carrying serious damage in the experimental field, additionally, a small number of physiological bacterial wilt in boundary land, it is required to timely check the irrigation zone of the boundary land in the next year and timely deal with it to meet normal water demand of rice.

Embodiment 2

The steps of planting rice using drip irrigation under plastic mulch films are as follows:

1. Seed Preparation

Before seeding, it is ensured to carry out deawning processing for rice seed by using special small-size deawning machinery, and relatively ideal effect could be achieved by processing each batch of seed for 4 minutes.

2. Land Preparation

During the full growth period of the rice drip irrigation under plastic mulch films, the chemical weeding method combined with manual weed removal method is used to remove weeds: generally, carrying out soil sealing treatment 5 days ahead of seeding, spraying 80 g of composite herbicide per mu, 15 days after seeding, when the weeds in the paddy field of drip irrigation under plastic mulch films occur the first peak, applying 60 g of composite herbicide per mu. The specific types of agents may depend on the types of the field weeds, several kinds of agents are selected in targeted for mixing, and used for twice chemical control. It is appropriate to choose the farmland with the soil containing above 1.5% organic content, above 50 mg/kg alkali-hydrolyzale nitrogen, more than 18 mg/kg of rapid available phosphorus, moderate soil fertility and above, small amount of salt and alkali, so as to facilitate high yield.

3. Sowing

When the 5 cm-under-film ground temperature is stably above 15° C., sowing can be done. Generally, it is in the early of middle April in South Xinjiang and later period of middle April in North Xinjiang. Seeding amount is determined based on the Thousand Kernel Weight, the seeding rate per hectare is determined by 25 g TKW, the mechanical sowing rate per hectare of the rice via drip irrigation under plastic mulch films is about 150 kg. For the rice varieties with smaller TKW, the size of the seeding hole is appropriately reduced, otherwise enlarged, so as to ensure that the number of the seeding particles is 7-9 for each hole. The process of drip irrigation zone pavement via drip irrigation under plastic mulch films sower, plastic mulch films mulch, dibbling, earthing should be completed for one time. It requires even seeding, no re-seeding, no miss-seeding, consistent seeding depth, good earthing, reliable pressing, upright row from edge to edge. An improved packing auger-type earthing seeding device is used for sowing, the Patent Number of the packing auger-type earthing seeding device is 201310307046.3, seeding density is 30500 holes/mu, width of each film is 150 cm, 1-film-2-tube-8-line arrangement is adopted, distance between holes within same line is 10 cm, planting width is 165 cm, and line spacing layout is as follows: 10 cm, 26 cm, 10 cm, 26 cm, 10 cm, 26 cm, 10 cm and 47 cm, respectively. Two drip tubes are evenly distributed among 8 rows of paddy, and the average line spacing of drip tubes is 82.5 cm 4. Seedling Management The rooting agents or root-strengthening agents can be adopted in the seedling period of the rice via drip irrigation under plastic mulch films for processing, generally, dripping twice before tillering stage after seeding, each dosage is 250 ml, the type of specific rooting agents can be selected according to local market research, the dosage is 1.5 times of the one recommended by manufacturers.

5. Seedlings Releasing Intertillage

For the paddy fields with drip irrigation under plastic mulch films, if there is the failure of emergence of seedlings by own, seedlings are timely checked and released, so as to avoid rotten seedling. Intertillage is omitted or implemented for once during the full growth period of the rice: it is in trefoil stage, the purpose of intertillage is to loosen the soil, preserve soil moisture and wipe out seeds. It is required to use sweep point to cut soil, smash and rise to the soil separation plate, ploughing depth can be up to 20 cm. Seedling pressing and folding is not allowed. During wide-film planting, the main purpose of intertillage is to weed out.

6. Irrigation Management

Irrigation systems vary greatly with different regions and different soil texture. Generally, dripping 45 times during full growth period, irrigation period is 3-4 days, and adjusted to 1-2 days in water-need peak season, irrigation norm is about 10500 m³/hm².

In which,

Emergence of Seedlings to Trefoil Stage:

When the soil moisture status is poor after rice growing, timely dripping seedling water after planting, carrying out irrigation in 3 times, the total irrigation amount is 900 m³/hm²;

Trefoil Stage to Jointing:

In such a period, carrying out irrigation for 10 times, the total irrigation amount is 2400 m³/hm².

Jointing to Heading:

In such a period, carrying out dripping for 10 times, the total irrigation amount is 2700 m³/hm².

Heading to Flowering:

In such a period, carrying out dripping for 6 times, the total irrigation amount is 1200 m³/hm².

Flowering to Ripe:

In such a period, carrying out dripping for 16 times, the total irrigation amount is 3300 m³/hm², stopping irrigation at the end of rice waxen maturity.

7. Fertilizing Management

Usually, based on the soil fertility and fertilizer response effects of the rice planting plot, the target yield and fertilizing amount are determined, the principle of organic and inorganic combination should be used in the rice fertilization, at the same time, paying attention to integrate with the fertilizer practice and high yield and high quality cultivation techniques, especially noting water and fertilizer joint control. During the full growth period of rice, the total fertilizing amount is as follows: animal manure (compost chicken manure and cow dung are mixed by mass ratio of 3:2): 20 t/hm², soluble organic fertilizer 150 kg/hm², pure nitrogen 320 kg/hra², $P_2O_5$ 160 kg/hm², $K_2O$ 70 kg/hm², water-soluble Si-fertilizer 30 kg/hm², boric fertilizer and zinc fertilizer 8 kg/hm² respectively.

In which,

Base Fertilizer:

Fertilizing farmyard manure when ploughing fields in autumn approaching winter, 20 t/hm$^2$ of animal manure (compost chicken manure and cow dung are mixed by mass ratio of 3:2) and 50 kg/hm$^2$ of diamonium phosphate are applied for one time and evenly, and then, the fields are deeply ploughed up to 27-30 cm and then leveled.

Seedling Fertilizer:

Fertilizing paddy field based on the crops, if soil is saline and alkaline, has uneven fertility, lack of nutrient, and some seedlings are weak, 30 kg/hm$^2$ of pure nitrogen, 25 kg/hm$^2$ of P$_2$O$_5$, 10 kg/hm$^2$ of K$_2$O and 4 kg/hm$^2$ of Zinc fertilizer are dripped along with water in 2-3 times to promote the growth of seedlings.

Tillering Fertilizer:

Tillering stage is a critical period for the vegetative growth of rice, determining the number of effective tillering and conditions of nutrients storing, in such a period, 110-120 kg/hm$^2$ of pure nitrogen, 38 kg/hm$^2$ of P$_2$O$_5$, 10 kg/hm$^2$ of K$_2$O, 30 kg/hm$^2$ of water-soluble Si-fertilizer, 8 kg/hm$^2$ of boric fertilizer and 4 kg/hm$^2$ of Zinc fertilizer are applied along with water in 3 times to promote the effective tiller number and quality of nutrient storage of the rice in 3 times.

Jointing Fertilizer:

In such a period, vegetative growth and reproductive growth of rice are very vigorous, water fertilizer should be dripped to the weak seedling in advance, and appropriately delaying dripping for flourishing and strong seedling, the fertilizer is dripped in 2 to 3 times, the total fertilizing amount is: 114 kg/hm$^2$ of pure nitrogen, P$_2$O$_5$ 35 kg/hm$^2$, K$_2$O 25 kg/hm$^2$ and 75 kg/hm$^2$ of soluble organic fertilizers.

Earing Fertilizer:

In such a period, young ear grows rapidly, and such period is a critical period to develop seeds per ear. The fertilizer is dripped in 3 to 4 times, the total fertilizing amount is: 55 kg/hm$^2$ of pure nitrogen, P$_2$O$_5$ 35 kg/hm$^2$, K$_2$O 25 kg/hm$^2$ and 75 kg/hm$^2$ of soluble organic fertilizer.

8. Pest Termination

Under weather conditions in Xinjiang and drip irrigation cultivation mode, there is less pest and disease damage in the rice, in recent years, there is almost no pest carrying serious damage in the experimental field, additionally, a small number of physiological bacterial wilt occurs in boundary land, it is required to timely check the irrigation zone of the boundary land in the next year and timely deal with it to meet normal water demand of rice.

Embodiment 3

The steps of the rice using drip irrigation under plastic mulch films are as follows:

1. Seed Preparation

Before seeding, it is ensured to carry out deawning processing for rice seed by using special small-size deawning machinery, and relatively ideal effect could be achieved by processing each batch of seed for 6 minutes.

2. Land Preparation

During the full growth period of the rice drip irrigation under plastic mulch films, the chemical weeding method combined with manual weed removal method is used to remove weeds: generally, carrying out soil sealing treatment 5 days ahead of seeding, spraying 80 g of composite herbicide per mu, 15 days after seeding, when the weeds in the paddy field of drip irrigation under plastic mulch films occur the first peak, applying 60 g of composite herbicide per mu. The specific types of agents may depend on the types of the field weeds, several kinds of agents are selected in targeted for mixing, and used for twice chemical control. It is appropriate to choose the farmland with the soil containing above 1.5% organic content, above 50 mg/kg alkali-hydrolyzale nitrogen, more than 18 mg/kg of rapid available phosphorus, moderate soil fertility and above, small amount of salt and alkali, so as to facilitate high yield.

3. Sowing

When the 5 cm-under-film ground temperature is stably above 15° C., sowing can be done. Generally, it is in the early of middle April in South Xinjiang and later period of middle April in North Xinjiang. Seeding amount is determined based on the Thousand Kernel Weight, the seeding rate per hectare is determined by 25 g TKW, the mechanical sowing rate per hectare of the rice via drip irrigation under plastic mulch films is about 130 kg. For the rice varieties with smaller TKW, the size of the seeding hole is appropriately reduced, otherwise enlarged, so as to ensure that the number of the seeding particles is 7-9 for each hole. The process of drip irrigation zone pavement via drip irrigation under plastic mulch films sower, plastic mulch films mulch, dibbling, earthing should be completed for one time. It requires even seeding, no re-seeding, no miss-seeding, consistent seeding depth, good earthing, reliable pressing, upright row from edge to edge. An improved packing auger-type earthing seeding device is used for sowing, the Patent No. of the packing auger-type earthing seeding device is 201310307046.3, seeding density is 36000 holes/mu, width of each film is 220 cm, distance between holes within same line is 9 cm, 1-film-3-tube-12-line is adopted, line spacing layout is: 13 cm, 24 cm, 13 cm, 20 cm, 13 cm, 24 cm, 13 cm, 20 cm, 13 cm, 24 cm, 13 cm and 50 cm, respectively, three drip tubes are evenly distributed among 12 rows of paddy, the average line spacing of drip tubes is 78 cm, and the planting width of single film is 240 cm.

4. Seedling Management

The rooting agent or root-strengthening agent can be adopted in the seedling period of the rice via drip irrigation under plastic mulch films for processing, generally, dripping twice before tillering stage after seeding, each dosage is 150 ml, the type of specific rooting agent can be selected according to local market research, the dosage is 2.5 times of the one recommended by manufacturer.

5. Seedlings Releasing Intertillage

For the paddy fields with drip irrigation under plastic mulch films, if there is the failure of emergence of seedlings by own, seedlings are timely checked and released, so as to avoid rotten seedling. Intertillage is omitted or implemented for once during the full growth period of the rice: it is in trefoil stage, the purpose of intertillage is to loosen the soil, reserve soil moisture and wipe out seeds. It is required to use sweep point to cut soil, smash and rise to the soil separation plate, ploughing depth can be up to 18 cm. Seedling pressing and folding is not allowed. During wide-film planting, the main purpose of intertillage is to weed out.

6. Irrigation Management

Irrigation systems vary greatly with different regions and different soil texture. Generally, dripping 38 times during full growth period, irrigation period is 3-4 days, and adjusted to 1-2 days in water-need peak season, irrigation norm is about 11250 m$^3$/hm$^2$.

In which,

Emergence of Seedlings to Trefoil Stage:

When the soil moisture status is poor after rice growing, timely dripping seedling water after planting, carrying out irrigation for twice, the total irrigation amount is 1050 m$^3$/hm$^2$;

Trefoil Stage to Jointing:

In such a period, carrying out irrigation for 8 times, the total irrigation amount is 2550 $m^3/hm^2$.

Jointing to Heading:

In such a period, carrying out dripping for 9 times, the total irrigation amount is 2850 $m^3/hm^2$.

Heading to Flowering:

In such period, carrying out dripping for 5 times, the total irrigation amount is 1350 $m^3/hm^2$.

Flowering to Ripe:

In such a period, carrying out dripping for 14 times, the total irrigation amount is 3450 $m^3/hm^2$, stopping irrigation at the end of rice waxen maturity.

7. Fertilizing Management

Usually, based on the soil fertility and fertilizer response effects of the rice planting plot, the target yield and fertilizing amount are determined, the principle of organic and inorganic combination should be used in the rice fertilization, at the same time, paying attention to integrate with the fertilizer practice and high yield and high quality cultivation techniques, especially noting water and fertilizer joint control. During the full growth period of rice, the total fertilizing amount is as follows: animal manure (compost chicken manure and cow dung are mixed by mass ratio of 3:2): 20 $t/hm^2$, soluble organic fertilizer 140 $kg/hm^2$, pure nitrogen 300 $kg/hra^2$, $P_2O_5$ 150 $kg/hm^2$, $K_2O$ 80 $kg/hm^2$, water-soluble Si-fertilizer 28 $kg/hm^2$, Boric fertilizer and Zinc fertilizer 8 $kg/hm^2$ respectively.

In which,

Base Fertilizer:

Fertilizing farmyard manure when ploughing fields in autumn approaching winter, 20 $t/hm^2$ of animal manure (compost chicken manure and cow dung are mixed by mass ratio of 3:2) and 40 $kg/hm^2$ of diamonium phosphate are applied for one time and evenly, and then, the fields are deeply ploughed up to 27-30 cm and then leveled.

Seedling Fertilizer:

Fertilizing paddy field based on the crops, if soil is saline and alkaline, has uneven fertility, lack of nutrient, and some seedlings are weak, 20 $kg/hm^2$ of pure nitrogen, 25 $kg/hm^2$ of $P_2O_5$, 12 $kg/hm^2$ of $K_2O$ and 4 $kg/hm^2$ of zinc fertilizer are dripped along with water in 2-3 times to promote the growth of seedlings.

Tillering Fertilizer:

Tillering stage is a critical period for the vegetative growth of rice, determining the number of effective tillering and conditions of nutrients storing, in such a period, 112 $kg/hm^2$ of pure nitrogen, 33 $kg/hm^2$ of $P_2O_5$, 13 $kg/hm^2$ of $K_2O$, 28 $kg/hm^2$ of water-soluble Si-fertilizer, 8 $kg/hm^2$ of Boric fertilizer and 4 $kg/hm^2$ of Zinc fertilizer are applied along with water in 3 times to promote the effective tiller number and quality of nutrient storage of the rice.

Jointing Fertilizer:

In such a period, vegetative growth and reproductive growth of rice are very vigorous, water fertilizer should be dripped to the weak seedling in advance, and appropriately delaying dripping for flourishing and strong seedling, the fertilizer is dripped for 2 to 3 times, the total fertilizing amount is: 110 $kg/hm^2$ of pure nitrogen, $P_2O_5$ 35 $kg/hm^2$, $K_2O$ 28 $kg/hm^2$ and 70 $kg/hm^2$ of soluble organic fertilizer;

Earing Fertilizer:

In such a period, young ear grows rapidly, and such a period is a critical period to develop seeds per ear. Fertilizer is dripped for 3 to 4 times, the total fertilizing amount is: 50 $kg/hm^2$ of pure nitrogen, $P_2O_5$ 35 $kg/hm^2$, $K_2O$ 27 $kg/hm^2$ and 70 $kg/hm^2$ of soluble organic fertilizer.

8. Pest Termination

Under weather conditions in Xinjiang and drip irrigation cultivation mode, there is less pest and disease damage in the rice, in recent years, there is almost no pest carrying serious damage in the experimental field, additionally, a small number of physiological bacterial wilt occurs in boundary land, it is required to timely check the irrigation zone of the boundary land in the next year and timely deal with it to meet normal water demand of rice.

Embodiment 4

The difference between the present embodiment and embodiment 1 lies in that:

In seeding steps, the seeding density is 34000 holes/mu, distance between holes within same line is 9 cm, and the line spacing layout of 1-film-3-tube-12-line is adopted. The rest is the same.

Embodiment 5

The difference between the present embodiment and embodiment 2 lies in that: In seeding steps, the seeding density is 32600 holes/mu, distance between holes within same line is 9 cm, and the line spacing layout of 1-film-2-tube-8-line is adopted. The rest is the same.

I. Specific Test for the Rice Using Drip Irrigation Under Plastic Mulch Films Based on Seeding Density, Distance Between Holes within Same Line and Other Parameters Implemented by the Inventors Yang Huijie et al. believes that the superhigh yield of rice is achieved via ensuring enough spike number firstly, and on this basis, cultivating big spike, and forming relatively more total volume per square meter. Production practice has proved that on one hand, overemphasizing on big spike tend to cause poor rice quality, on the other hand, it tends to cause low setting percentage. With the improvement on cultivation measure and irrigation and fertilization measure, it is capable of further exploring the method for improving the density of rice using drip irrigation under plastic mulch films, and improving maturing rate of rice via increasing spike and particles to expand yield storage capacity, so as to improve rice yields. From 2010 to 2011, based on the screening tests of variety, the inventors carried out the density test and study on planting pattern of the rice using drip irrigation under plastic mulch films, so as to make sure the appropriate density of the rice and distance between holes within same line configuration, hoping to obtain higher target yield.

1. Testing Scheme

The specific date of test sowing was on May 1, 2013, variety was T-43, mechanically rupturing membranes, artificially dribble seeding, and seeding depth was 2-3 cm, 8-10 particles for each hole. Six treatments were provided, triplication randomized block design, specific configuration was shown in Table 1. Based on the growth characteristics of rice, supply water in appropriate time and amount, water and fertilizer combination, fertilizing while dripping water, the planned irrigation amount in the full growth period was 750 $m^3/666.7\ m^2$, fertilizing amount of urea was 40 $kg/666.7\ m^2$, 20 $kg/666.7\ m^2$ of Feidigai (the name of a fertilizer, mainly comprising major element ($N+P_2O_5+K_2O$): not less than 58%, purchased from Xinjiang Boshuosi Chemical Fertilizer Co., Ltd., full name: macroelement water-soluble fertilizer), seed testing and yield estimation should be implemented for each treatment in mature period, and the indexes comprise the number of full grains, setting percentage, percentage of earbearing tiller and theoretical yield.

TABLE 1

Configuration scheme for rice planting pattern and density test

| Treatment | Row spacing | Density (10000 holes/mu) | Film width | Width (m) | Line spacing (cm) | Planting pattern |
|---|---|---|---|---|---|---|
| 1 | 12 | L59 | 1.15 | 1.40 | 20 + 40 + 20 + 60 | 1-film-1-tube-4-line |
| 2 | 10 | 1.90 | | | | |
| 3 | 12 | 2.54 | 1.6 | L75 | 12.5 + 25 + 12.5 + 25 + 12.5 + 25 + 12.5 + 50 | 1-film-2-tube-8-line |
| 4 | 10 | 3.05 | | | | |
| 5 | 12 | 2.78 | 2.2 | 2.4 | 13 + 24 + 13 + 20 + 13 + 24 + 13 + 20 + 13 + 24 + 13 + 50 | 1-film-3-tube-12-line |
| 6 | 10 | 3.33 | | | | |

Figure 2:
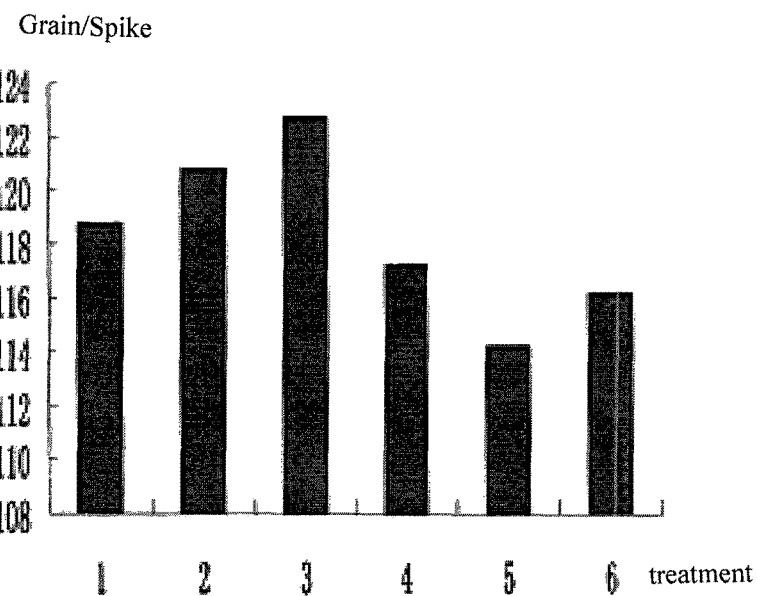
FIG. 2 is the comparison in full grains of the rice using drip irrigation under plastic mulch films with different seeding densities.
Figure 3:
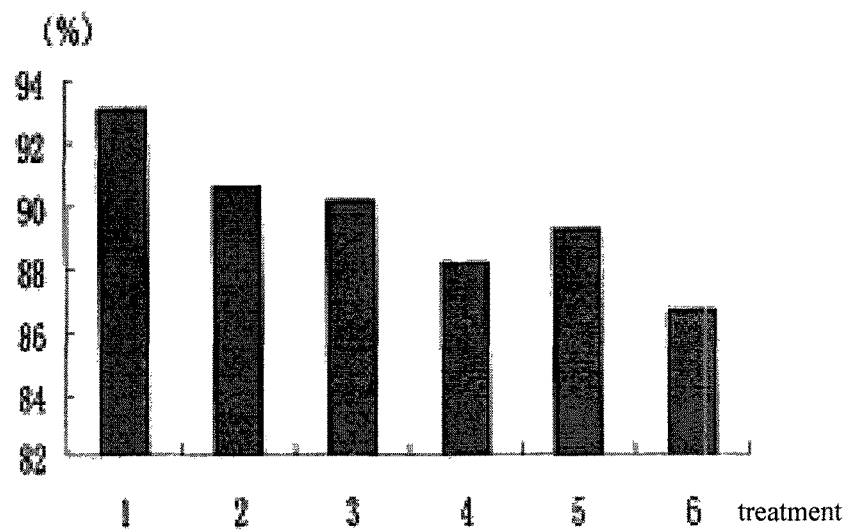
FIG. 3 is the comparison in setting percentage of the rice using drip irrigation under plastic mulch films with seeding different densities.
Figure 4:
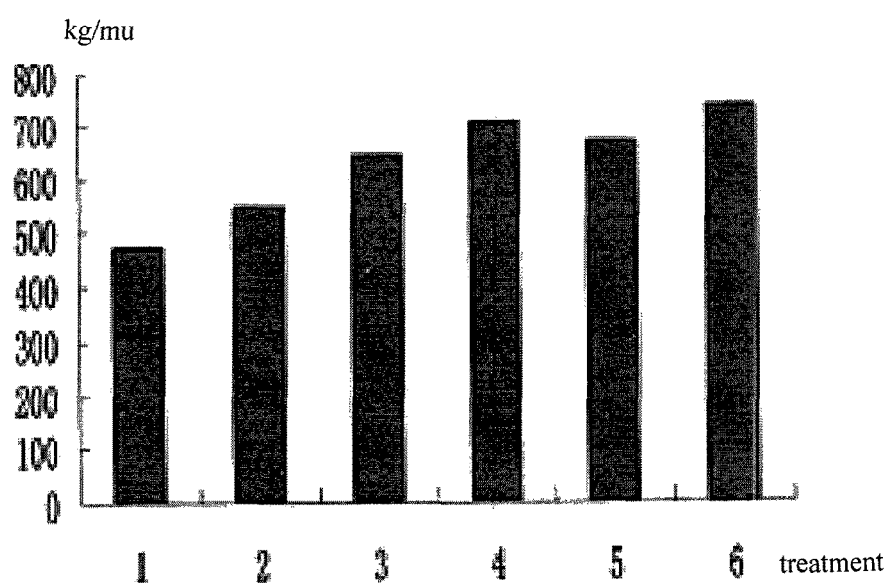
FIG. 4 is the comparison in yield of the rice using drip irrigation under plastic mulch films with different seeding densities.

2. Test results and analysis were shown in Table 2 and FIGS. 1-4.

TABLE 2

Yield trait survey for planting pattern and density test

| Treatment | Density (ten thousand holes/mu) | Harvesting density (ten thousand holes/mu) | Number of productive ears (ten thousand spikes/mu) | Number of full grains (grain/spike) | Fructification percentage (%) | TKW (g) | Theoretical yield (Kg/mu) |
|---|---|---|---|---|---|---|---|
| 1 | 1.59 | 1.51 | 16.97e | 118.74 abc | 93.14 a | 25.15 a | 472.01 f |
| 2 | 1-9 | 1.76 | 19.63 d | 120.83ab | 90.61ab | 25.21 a | 541.81 e |
| 3 | 2.54 | 2.33 | 22.88 c | 122.77 a | 90.17 ab | 25.35 a | 642.08d |
| 4 | 3.05 | 2.78 | 2S.16 ab | 117.32 bcd | 88.13 ab | 24.12 a | 702.27b |
| 5 | 2.78 | 2.49 | 26.34 b | 11417 d | 89.19 ab | 24.83 a | 665.98c |
| 6 | 3.33 | 2.85 | 29.75 a | 116.2 cd | 86.62 b | 24.64 a | 737.82a |

It can be seen from Table 2 to FIGS. 1-4 that with the increase of density, the number of productive ears of rice also increased, there was less difference between number of productive ears of treatment 4 and treatment 6, but the difference between other treatment was obvious, and there was significant difference in the number of full grains among the 6 treatments, but not obvious, probably because the variety characteristic of full grain number of each spike weighed more than external factors such as water and fertilizer. Great difference was only between treatments 3 and 6. With the increase of density, setting percentage decreased, but there was no significant difference among treatments except for treatments 1 and 6. The reason why the setting percentage decreases was that with the increase of group density, individuals shield mutually, influencing photosynthesis, resulting in the drops of setting percentage, the TKW difference among the 6 treatments was not significant, indicating that the change of density slightly influenced the TKW. There was a higher yield of the six density treatments, and different was significant, with the increase of density, yield also increased, the maximum yield under the planting pattern of 33300 holes/mu (1-film-3-tube-12-line) was 737.82 kg/mu, and the yield under the planting pattern of 30500 holes/mu (1-film-2-tube-8-line) was also up to 700 kg/mu, indicating that such two patterns were suitable for drip irrigation under plastic mulch films rice cultivation, dripping was relatively even, beneficial for the absorption of water and nutrients. The number of productive ears, kernels per spike, setting percentage and TKW of the rice constitute the rice yield factors. To sum up, with the increase of density, yield also increased more and more, the change of density had less influence on the kernels per spike and TKW of rice, and had a certain influence to the setting percentage, and more influence to the number of productive ears. 1-film-3-tube-12-line and 1-film-2-tube-8-line, and 10 cm of distance between holes within same line, these two patterns were relatively suitable for the planting of the rice using drip irrigation under plastic mulch films.

II. Specific Test on Water Demand Regulation of the Rice Using Drip Irrigation Under Plastic Mulch Films Implemented by the Inventors From 2011 to 2013, based on variety test and density test, the inventors carried out the study on the water demand regulation and irrigation program of the rice using drip irrigation under plastic mulch films in different periods, and studied the water consumption rules of the rice using drip irrigation under plastic mulch films in growth period of rice, comprising water consumption of the rice during full growth period and water consumption extent in each growth period.

(1) Experiment Scheme

Rice variety (T-43), urea, monopotassium phosphate and soil conditioner. Five treatments were provided, triplication for each treatment, each treatment area was 66.67 m². 25 kg soil conditioner per mu was used to improve soil structure while ploughing in autumn 2010, 8 kg/mu of base fertilizer urea, 5 kg/mu of three fertilizers (N, P and K fertilizers) and 20 kg/mu of organic fertilizer. Specific design scheme is shown in Table 3.

TABLE 3

Water demands processing for the rice using drip irrigation under plastic film

| Treatment | Irrigation amount (m³) | Fertilizer amount(kg/mu) | |
|---|---|---|---|
| | | Urea (kg/mu) | Monopotassium phosphate (kg/mu) |
| 1 | 600 | 30 | 20 |
| 2 | 650 | 30 | 20 |
| 3 | 700 | 30 | 20 |
| 4 | 750 | 30 | 20 |
| 5 | 800 | 30 | 20 |

(2) Basic Management of Test Field

Seeding method adopts mechanized dribble seeding on film, pattern: 1-film-2-tube-8-line, width of each film was 1.6 m, hill spacing was 10 cm, 8-12 grains in each hole, seeding depth was 2-3 cm, and drip irrigation zone was 2.1 L/h. High-frequency irrigation mode was adopted in full growth period, irrigating 40 times in total, the fertilizer was applied with water dripping, and completed in 10 times.

(3) Sampling and Test Method

Sampling period was divided into tillering stage, jointing stage, booting stage, heading stage, milk-ripe stage and harvest stage. One strip of film in the middle part of each section was chosen, and the continuous 5 holes of plants were selected with representative to be killed out at 105° C. for 30 min, and then, dried at 75° C. for 48 h to constant weight, and respectively weighing dry weight. The dried samples were respectively smashed for measurement after being sub-packaged.

Yield determination before harvest, treatment 0.5 m² plants were taken for indoor laboratory test. Specific measuring items comprised the number of productive ears, full grains, blighted grain number and thousand seed weight.

(4) Result and Analysis

① The influences of different irrigation amounts on the water-saving growing process of the rice using drip irrigation under plastic mulch films It can be seen from Table 4 that different irrigation amounts had less influence on tillering stage of the rice using drip irrigation under plastic mulch films, treatment 4 was one day ahead of other treatments. The growth periods of jointing stage, heading stage and pustulation stage gradually prolong with the increase of irrigation amount, indicating that with the increase of water amount, the vegetative period of the rice increases, it was relatively late to enter into reproductive growth.

TABLE 4

Influence of different irrigation amounts on development progress of rice

| Growth period | Treatment | | | | |
| --- | --- | --- | --- | --- | --- |
| | 1 | 2 | 3 | 4 | 5 |
| Tillering stage | 5/24 | 5/24 | 5/24 | 5/23 | 5/24 |
| Jointing stage | 7/8 | 7/8 | 7/10 | 7/12 | 7/13 |
| Heading stage | 8/5 | 8/7 | 8/8 | 8/10 | 8/13 |
| Pustulation stage | 8/14 | 8/14 | 8/15 | 8/17 | 8/19 |

② The influences of different irrigation amounts on plant height, leaf and tillering of rice using drip irrigation under plastic mulch films were shown in Table 5.

It can be seen from Table 5 that different irrigation amount almost had no influence on the leaf number of rice using drip irrigation under plastic mulch films in each growth period, mainly because the leaf number belonged to hereditary character. With the increase of irrigation amount, the plant height of the rice in each growth period also increased, but influence of different irrigation amount on plant height was almost the same. The change of irrigation amount mainly affected the tiller-earing period to certain extent, in jointing stage, with the increase of irrigation amount tiller number increased, but ineffective tillering also increased.

③ The influences of different irrigation amounts and fertilizing amounts on the yield components were shown in Table 6.

Table 6 Influences of different irrigation amounts on yield components

TABLE 6

Influences of different irrigation amounts on yield components

| Treatment | Number of productive ears (ten thousand spikes/mu) | Kernels per spike (piece) | Fructification percentage (%) | TKW (g) | Theoretical yield (kg/mu) |
| --- | --- | --- | --- | --- | --- |
| 1 | 25.47c | 117.38 b | 78.20 a | 22.85 a | 529.54 c |
| 2 | 25.93 bc | 117.79 b | 77.40 a | 23.03 a | 544.43c |
| 3 | 26.81bc | 126.12 a | 76.27 a | 23.01 a | 593.41b |
| 4 | 28.23 a | 128.31 a | 78.50 a | 23.12 a | 657.40a |
| 5 | 27.16 ab | 127.48 a | 75.89 a | 23.48 a | 616.96 b |

It can be seen from Table 6 that the different irrigation amounts had no obvious influence on the setting percentage and thousand seed weight of rice using drip irrigation under plastic mulch films in each growth period, there was no significant difference among the five treatments, the difference of the number of productive ears among the five treatments was not obvious, great difference only existed between treatments 1 and 4, indicating that 600 m³ irrigation amount seriously affected the tillering and ear bearing, 800 m³ irrigation amount caused too much invalid tillering, influencing effective tillering, there was significant difference of the kernels per spike between treatment 1 and 2 and other treatments, which might be caused by the production of spikelets due to the unsatisfied water demand during

TABLE 5

Influences of different irrigation amounts on rice morphology

| | Tillering stage | | | Jointing stage | | | Heading stage | | | Pustulation stage | | |
| --- | --- | --- | --- | --- | --- | --- | --- | --- | --- | --- | --- | --- |
| Treatment | Plant height (cm) | Leaf number | tiller number per plant | Plant height (cm) | Leaf number | tiller number per plant | Plant height (cm) | Leaf number | tiller number per plant | Plant height (cm) | Leaf number | tiller number per plant |
| 1 | 27 | 5 | 1 | 57 | 11 | 4 | 80 | 15 | 3 | 87 | 15 | 2 |
| 2 | 26 | 5 | 1 | 60 | 11 | 3 | 79 | 15 | 2 | 91 | 15 | 1 |
| 3 | 26 | 5 | 1 | 59 | 11 | 4 | 81 | 15 | 4 | 90 | 15 | 2 |
| 4 | 28 | 5 | 1 | 58 | 11 | 3 | 77 | 15 | 2 | 93 | 15 | 3 |
| 5 | 29 | 5 | 1 | 61 | 11 | 5 | 82 | 15 | 4 | 92 | 15 | 1 | heading period, influencing the kernels per spike. With the increase of irrigation amount, yield also increased, the yield of treatment 4 was the maximum. 800 m³ irrigation amount influenced the later grouting, causing decrease of number of productive ears, and resulting in decreased yield, probably because the excessive vegetative growth in earlier stage.

For 750 m³ and 800 m³ irrigation amount, the number of productive ears, kernels per spike, thousand seed weight and yield were higher comprehensively, 600 m³ irrigation amount was less than the water demand for the growth period of the rice in Xinjiang, causing less tiller number and kernels per spike, finally, causing decline of yield. Due to climate in 2011, it caused lower fructification percentage, otherwise the rice yield was higher due to higher fructification percentage.

In the end, what should be stated is that: the abovementioned is only the optimized embodiments of this invention, and does not mean to limit this invention, although this invention has been specified in detail based on the abovementioned embodiments. For those skilled in this field, it is still available to modify the technical solutions specified in the above embodiments, or equivalently replace partial features in the invention. Any modification, equivalent replacement, improvement and the like implemented within the spirit and principle of this invention shall be included in the scope of this invention.

The invention claimed is:

1. A method for rice cultivation under a plurality of plastic mulch films via drip irrigation, comprising seed preparation, land preparation, sowing in lines, seedling management, irrigation management, and fertilization management, wherein seeding density of the sowing is 33300-36000 holes/mu, the width of each film is 215-225 cm, and distance between holes within same line is 9 to 10 cm, planting arrangement of every twelve lines under one film and using three drip tubes is such that distances between neighboring lines are as follows:

13 cm, 24 cm, 13 cm, 20 cm, 13 cm, 24 cm, 13 cm, 20 cm, 13 cm, 24 cm, 13 cm and 50 cm, respectively, three drip tubes are evenly distributed among twelve lines of rice.

2. The method for rice cultivation according to claim 1, wherein the land preparation comprises weed prevention, and the weed prevention is implemented via soil sealing treatment before sowing, spraying mixed herbicides, and 15-25 days later after planting, re-spraying mixed herbicides.

3. The method for rice cultivation according to claim 1, wherein during the seedling management, a rooting agent is applied by being dripped with water from planting to tillering period.

4. The method for rice cultivation according to claim 1, wherein the irrigation management is implemented via applying irrigation amount of 10500-12000 m³/hm² during whole growth period of rice.

5. The method for rice cultivation according to claim 4, wherein specific methods of the irrigation management for different stages are as follows:
emergence of seedlings stage to trefoil stage:
when soil moisture status is poor after rice growing, timely dripping seedling water after planting, carrying out irrigation for 2-3 times, total irrigation amount is 900-1200 m³/hm²;
trefoil stage to jointing stage:
in such a period from trefoil stage to jointing stage, carrying out irrigation for 8-10 times, total irrigation amount is 2400-2700 m³/hm²;

jointing stage to heading stage:
in such a period from jointing stage to heading stage, carrying out dripping for 9-10 times, total irrigation amount is 2700-3000 m³/hm²;
heading stage to flowering stage:
in such a period from heading stage to flowering stage, carrying out dripping for 5-6 times, total irrigation amount is 1200-1500 m³/hm²;
flowering stage to ripe stage:
in such a period from flowering stage to ripe stage, carrying out dripping for 14-16 times, total irrigation amount is 3300-3600 m³/hm².

6. The method for rice cultivation according to claim 4, wherein the irrigation management is implemented via dripping 38-45 times during whole growth period of rice.

7. The method for rice cultivation according to claim 1, wherein in a full growth period from plating to maturity, rice seedling and plants are fertilized with pure nitrogen fertilizer in an amount of 330-345 kg/hm².

8. The method for rice cultivation according to claim 7, wherein specific requirements of the fertilization management for different fertilizers are as follows:
base fertilizer:
fertilizing farmyard manure when ploughing fields in autumn approaching winter, 15-20 t/hm² animal manure and 40-50 kg/hm² diamonium phosphate are applied for one time and evenly, and then, deeply ploughing;
seedling fertilizer:
fertilizing paddy field based on the crops, if soil is saline and alkaline, has uneven fertility, lack of nutrient, spot leaf and some seedlings are weak, 20-30 kg/hm² of pure nitrogen, 25-30 kg/hm² of $P_2O_5$, 10-15 kg/hm² of $K_2O$ and 3.5-4 kg/hm² zinc fertilizer are dripped along with water in 2-3 times to promote the growth of seedlings;
tillering fertilizer:
in such a period, 110-120 kg/hm² of pure nitrogen, 30-40 kg/hm² of $P_2O_5$, 10-15 kg/hm² of $K_2O$, 25-30 kg/hm² of water-soluble Si-fertilizer, 7-8 kg/hm² of boric fertilizer and 3.5-4 kg/hm² of zinc fertilizer are applied along with water in 3 times;
jointing fertilizer:
in such a period, dripping fertilizer for twice or three times, total fertilizing amount is:
110-120 kg/hm² of pure nitrogen, $P_2O_5$ 35-40 kg/hm², $K_2O$ 25-30 kg/hm² and 60-75 kg/hm² of a soluble organic fertilizer;
earing fertilizer:
in such a period, dripping fertilizer for 3 to 4 times, total fertilizing amount is: 50 to 60 kg/hm² of pure nitrogen, $P_2O_5$ 30-40 kg/hm², $K_2O$ 25-30 kg/hm² and 60-75 kg/hm² of a soluble organic fertilizer.

9. The method for rice cultivation according to claim 7, wherein total fertilizing arrangement in a full growth period of rice comprises 15-20 t/hm² of animal manure, 120-150 kg/hm² of soluble organic fertilizer, 300-330 kg/hm² of pure nitrogen, 150-160 kg/hm² of $P_2O_5$, 70-90 kg/hm² of $K_2O$, 25-30 kg/hm² of water-soluble Si-fertilizer, 7-8 kg/hm² of Boric fertilizer and Zinc fertilizer respectively.

10. A method for rice cultivation under a plurality of plastic mulch films via drip irrigation, comprising seed preparation, land preparation, sowing in lines, seedling management, irrigation management, and fertilization management, wherein seeding density of the sowing is 30500-32600 holes/mu, the width of each film is 155-165 cm, and distance between holes within same line is 9-10 cm, planting arrangement of every eight lines under one film and using two drip tubes is such that distances between neighboring lines are as follows: 12.5 cm, 26 cm, 12.5 cm, 26 cm, 12.5 cm, 26 cm, 12.5 cm and 47 cm, respectively, two drip tubes are evenly distributed among eight lines of rice.

* * * * *